UNITED STATES PATENT OFFICE.

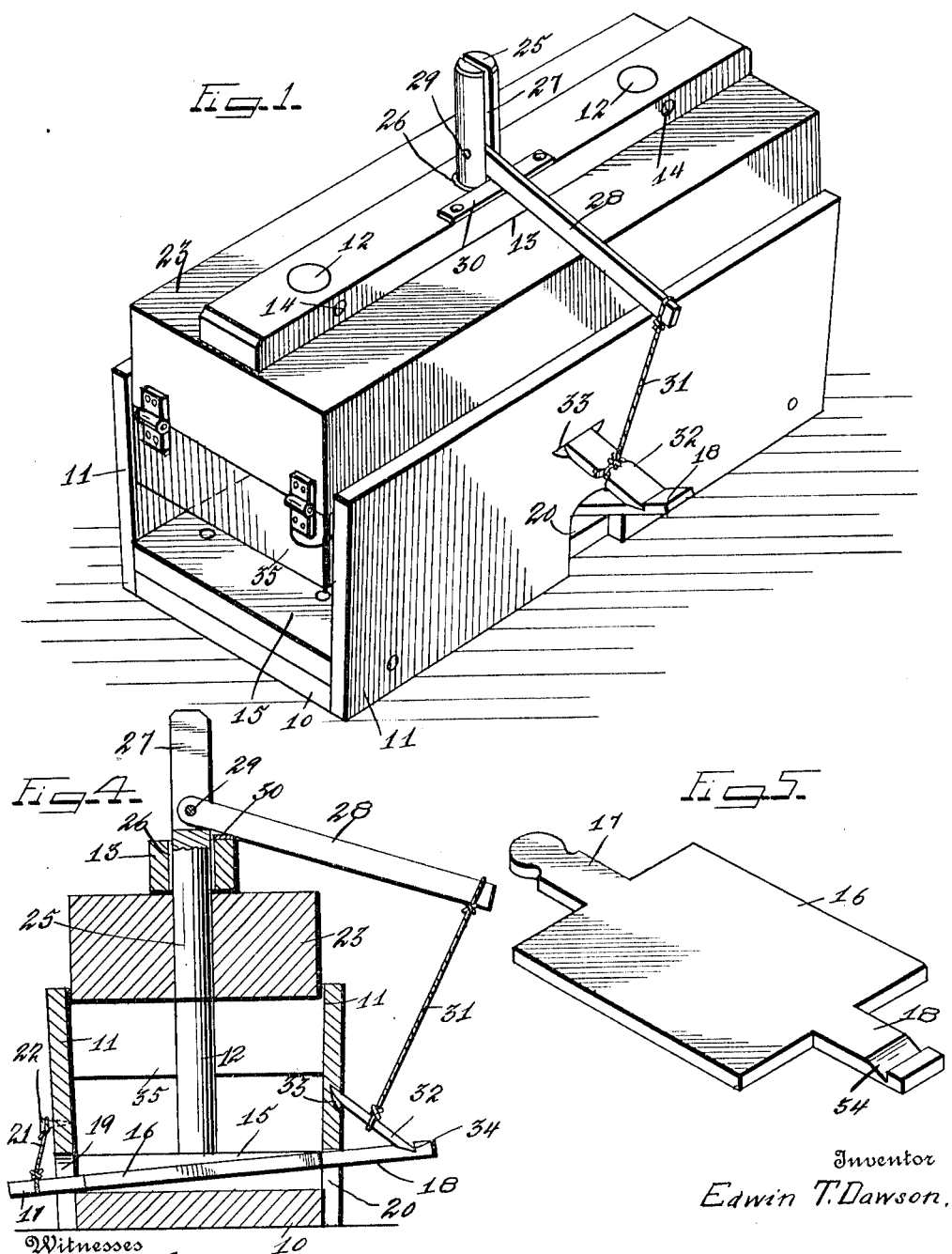

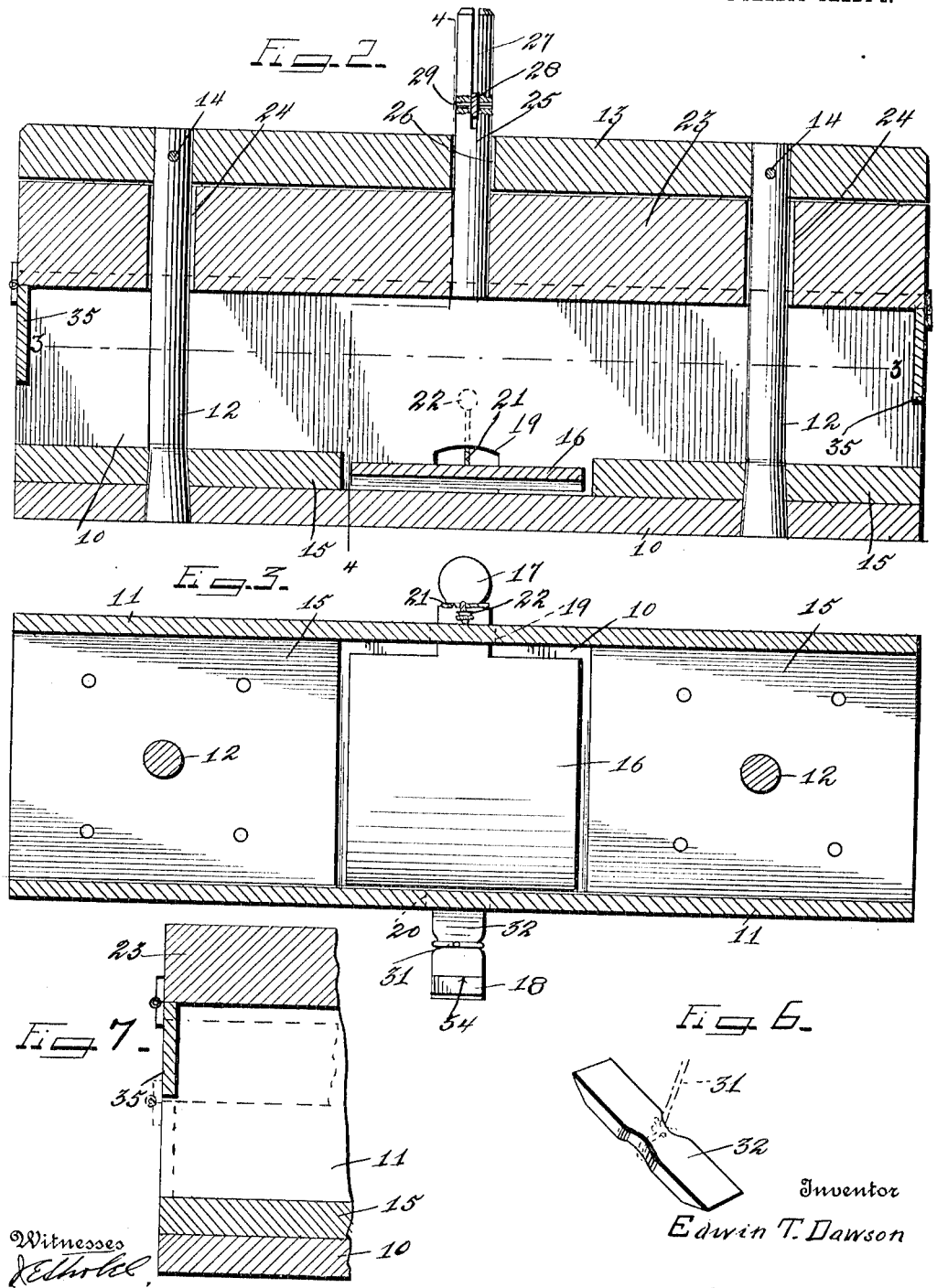

EDWIN T. DAWSON, OF LAMONI, IOWA.

TRAP.

1,090,031.  Specification of Letters Patent.  Patented Mar. 10, 1914.

Application filed June 9, 1913. Serial No. 772,677.

*To all whom it may concern:*

Be it known that I, EDWIN T. DAWSON, a citizen of the United States, residing at Lamoni, in the county of Decatur and State of Iowa, have invented certain new and useful Improvements in Traps, of which the following is a specification, reference being had therein to the accompanying drawing.

This invention relates to an animal trap which is intended to be principally used for killing small animals such as rats, and which may be used for catching animals such as rabbits alive.

Another object of the invention is the production of a trap with an improved releasable platform which may be adjusted, thereby permitting the trap to be sprung by animals of different weight.

With these and other objects in view, this invention consists of certain novel combinations, constructions and arrangements of parts as will be hereinafter fully described and claimed.

This invention is illustrated in the accompanying drawings, wherein:

Figure 1 is a perspective view of the trap in a set position. Fig. 2 is a longitudinal section through the trap in a set position. Fig. 3 is a longitudinal sectional view taken along the line 3—3 of Fig. 2. Fig. 4 is a longitudinal transverse section taken along the line 4—4 of Fig. 2. Fig. 5 is a perspective view of the tripping platform. Fig. 6 is a perspective view of the latch which holds the trap in a set position. Fig. 7 is a fragmentary sectional view showing a modified construction, by means of which the trap may be used for catching animals alive.

Referring to the accompanying drawings, it will be seen that the body portion of this trap comprises the bottom 10 carrying the side walls 11 and provided with a plurality of pins 12 constituting standards. These standards are carried by a bar 13 through which the upper ends of the standards project, so that the securing means 14 may be passed through the standards to hold the bar in place. Blocks 15 are secured to the bottom 10 and terminate short of the center so that a pit is formed in which the tripping platform is positioned.

The tripping platform 16 is positioned in the pit and is provided with end tongues 17 and 18 which extend through openings 19 and 20 formed in the side walls 11. The tongue 17 is provided with a line 21 secured to a screw 22 so that the platform 16 will be adjustably held in the pit. By adjusting this line 21, the platform 16 may be permitted to rest upon the bottom board 10 as illustrated in Fig. 4, or may be drawn upwardly and suspended so that it will take less weight to operate the trip than it would when the platform is positioned, as shown in Fig. 4.

A block 23 is mounted in the housing between the walls 11 and is provided with openings 24 through which the standards 12 pass, thus causing the standards to form guides for the block. The block 23 carries a stem 25 extending through an opening 26 in the center of the strip 13 and having its outer end provided with a longitudinally extending slot 27 in which a metallic strip 28 is pivotally mounted by means of the pin 29. This strip 28 forms a lever for holding the block in the raised position shown in Fig. 1, and rests upon a protecting strip 30 when the block is in a raised position. A line 31 is secured to the free end portion of the lever strip 28 and connects the lever strip 28 with a latch 32.

In the operation of this trap, the stem is drawn through the opening 26 and after the block 23 is raised to the position shown in Fig. 1, the strip 28 is turned downwardly to rest upon the protecting strip 30. The latch 32 is then placed with its inner end fitting in the notch 33 and its outer end fitting in the notch 24 formed in the outer end portion of the tongue 18. Before the latch is connected with the tongue 18, the line 21 is adjusted to suspend the platform at the desired height, or to permit the platform to rest upon the bottom board 10 so that the platform will be depressed by the desired amount of weight. After the trap has been set it is put in a place where animals are accustomed to travel, and when the animal enters the trap it will step upon the platform, thus pushing the platform downwardly to release the latch and permit the lever 28 to swing upwardly so that the block 23 can fall and kill the animal. If this trap is used for catching rats, the platform will support the weight of a mouse in the position shown in Fig. 4, therefore the trap will not be sprung by a mouse passing through it. If it is desired to catch animals smaller than rats, the platform is held in the raised position by the line 21 and then the weight of the smaller animals will release the catch 32. If it is desired to use this trap to catch animals alive the block 23 is provided with end plates 35 which strike the blocks 15 when the block 23 falls, thus forming end walls for the body portion. The end walls prevent the block from striking animals and therefore the animal is prevented from being killed or injured. If it is desired to use this form of trap to kill the animal, the parts 35 can be removed or turned outwardly thus permitting the block 23 to fall upon the animal and kill it. A trap is therefore provided which may be used in killing animals as well as for catching animals alive, and therefore serves two purposes.

What is claimed, is:—

A trap comprising a body portion, a block slidably mounted in said body portion, a plate pivotally connected with each end of said block whereby said plates may be lowered to form end walls when said block is in a lowered position, a stem extending from said block, a lever connected with said stem, a trip platform mounted in said body portion and provided with a tongue extending through an opening formed in the side walls of said body portion, a line connected with said lever, and a latch carried by said line and engaging notches formed in said tongue and the side wall of said body portion.

In testimony whereof I hereunto affix my signature in presence of two witnesses.

EDWIN T. DAWSON.

Witnesses:
L. J. FRINK,
FRANK HACKETT.

Copies of this patent may be obtained for five cents each, by addressing the "Commissioner of Patents, Washington, D. C."